(12) United States Patent
Ishino et al.

(10) Patent No.: US 8,237,626 B2
(45) Date of Patent: Aug. 7, 2012

(54) HEAD-MOUNTED DISPLAY

(75) Inventors: Toshiki Ishino, Hiratsuka (JP); Takaaki Nakabayashi, Kawasaki (JP); Yoshihiro Saito, Hachioji (JP); Toshiyuki Okuma, Chofu (JP)

(73) Assignee: Canon Kabushiki Kaisha, Tokyo (JP)

(*) Notice: Subject to any disclaimer, the term of this patent is extended or adjusted under 35 U.S.C. 154(b) by 827 days.

(21) Appl. No.: 12/055,783

(22) Filed: Mar. 26, 2008

(65) Prior Publication Data

US 2008/0238815 A1 Oct. 2, 2008

(30) Foreign Application Priority Data

Mar. 29, 2007 (JP) .................................. 2007-089044

(51) Int. Cl.
*G09G 5/00* (2006.01)
(52) U.S. Cl. .............. 345/8; 349/11; 359/630; 359/631; 359/632; 359/633; 359/634; 359/635; 359/636; 359/637; 359/638; 359/639; 359/640
(58) Field of Classification Search ........ 345/8; 349/11; 359/630–640
See application file for complete search history.

(56) References Cited

U.S. PATENT DOCUMENTS

| 6,388,640 B1* | 5/2002 | Chigira et al. ..................... 345/8 |
| 6,762,885 B1* | 7/2004 | Ogasawara et al. ........... 359/630 |
| 2007/0013611 A1* | 1/2007 | Nakabayashi et al. ............ 345/8 |
| 2009/0128450 A1* | 5/2009 | Nakabayashi et al. ............ 345/8 |

FOREIGN PATENT DOCUMENTS

| JP | 09-304724 | 11/1997 |
| JP | 10-142551 | 5/1998 |
| JP | 11-174988 | 7/1999 |
| JP | 2002-262196 | 9/2002 |
| JP | 2005-027867 | 2/2005 |

OTHER PUBLICATIONS

Medulla Oblongata, Wikipedia as of Jul. 7, 2011.*

* cited by examiner

*Primary Examiner* — Alexander S Beck
*Assistant Examiner* — Jeffrey Steinberg
(74) *Attorney, Agent, or Firm* — Cowan, Liebowitz & Latman, P.C.

(57) ABSTRACT

A head-mounted device mounted on a wearer's head has a first pressing unit to press against the wearer's head from a position of his/her medulla, a second pressing unit to press against the wearer's head in an opposite direction to a pressing direction of the first pressing unit, and a mounting unit to mount the head-mounted device on the wearer's head by adjusting at least one of the first pressing unit and the second pressing unit.

7 Claims, 7 Drawing Sheets

F I G. 5
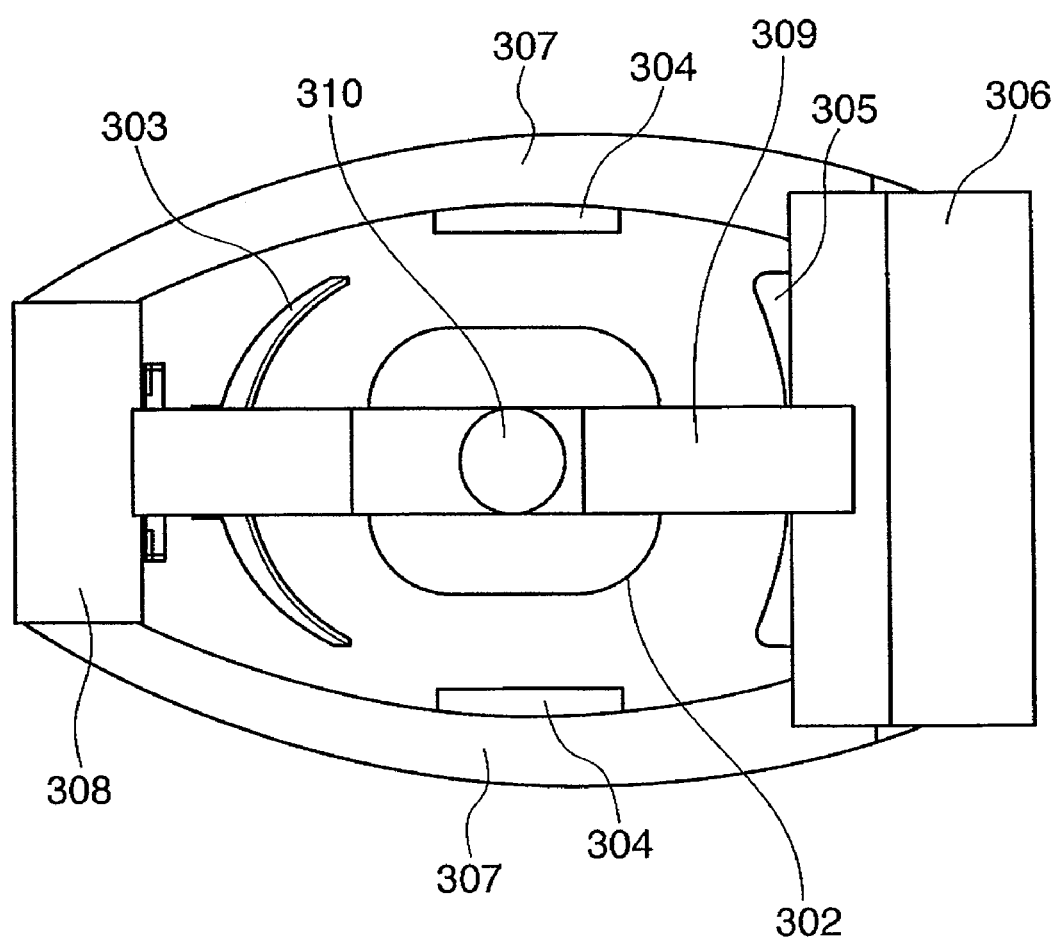

HEAD-MOUNTED DISPLAY

BACKGROUND OF THE INVENTION

1. Field of the Invention

The present invention relates to a head-mounted device. More particularly, the present invention relates to a head-mounted display, mounted on a viewer's head, to display a video image in front of the viewer, and relates to a structure for mounting the device on a viewer's head.

2. Description of the Related Art

In recent years, a head-mounted display which is mounted on a viewer's head is developed. This head-mounted display enlarges a video image displayed on a video display device such as a liquid crystal display and displays the enlarged image in front of the viewer, thereby enabling observation of a large screen video image.

Japanese Patent Laid-Open No. 11-174988 discloses a video display as shown in FIG. 6. In this display, a pair of left and right LCDs 3 as two-dimensional video display devices to display video images corresponding to a viewer's left and right eyes are provided inside an exterior frame 2 of a display main body 1. Further, a pair of backlights 4 to illuminate the LCDs 3 are provided in the rear of the respective LCDs 3, and a pair of prisms 5 respectively to enlarge and guide video images from the LCDs 3 are provided below the LCDs 3. Video images displayed on the LCDs 3 are guided in front of a viewer M's eyes E via an optical observation axis L. While the video images pass through the prisms 5, they are enlarged, and projected so as to be visualized in front of the eyes E.

Further, Japanese Patent Laid-Open Nos. Hei 9-304724 and 2002-262196 disclose structures for mounting a video display as described above on a viewer's head (hereinbelow, "a head-mounting structure"). For example, Japanese Patent Laid-Open No. 2002-262196 discloses a structure as shown in FIG. 7. In Japanese Patent Laid-Open Nos. Hei 9-304724 and 2002-262196, the structure has side frames corresponding to left and right positions of a viewer's head, provided with an occipital pad to be in contact with the viewer's occipital region. The structure presses the display on the viewer's head. The side frames are provided with an adjustment mechanism for fore and aft adjustment of the occipital pad. The video display is fixed on the viewer's head by adjusting the occipital pad in accordance with the size of the viewer's head.

However, in the head-mounting structures disclosed in Japanese Patent Laid-Open Nos. Hei 9-304724 and 2002-262196, the side frames connected to the occipital pad horizontally extend from the same height of the viewer's eye position. Accordingly, the occipital pad is brought into contact with the occipital region of viewer's head in a position on the higher side of the occipital region. Upon use of this structure to fasten the upper part of the viewer's head, the viewer feels as if the display easily slips off the head, and cannot obtain a feeling of comfortable fit.

To provide a comfortable fit to the viewer, as disclosed in Japanese Patent Laid-Open No. 2005-27867, when a portion below the viewer's head—the so-called "hollow of the neck (medulla)"—is pressed, the device can be stably fixed to the head without discomfort. As a structure pressing the peripheral portion of the viewer's hollow of the neck disclosed in Japanese Patent Laid-Open No. Hei 10-142551, a structure in which an arm including a pad to press against the hollow of the neck is attached to a frame passing over the parietal region of the viewer's head.

However, in Japanese Patent Laid-Open No. Hei 10-142551, as an excessive force is applied to a shaft of the occipital pad, it is necessary to design a rotating shaft connecting the frame passing over the parietal region with the arm as a firm member. Further, regarding the arm, because the distance between the point of application of force and the supporting point is long, the arm is distorted, and the required force pressing against the head cannot be obtained. Further, when the strength of the frame and the arm is increased, the weight of the respective members is also increased, thus providing a poor fit and reducing comfort.

SUMMARY OF THE INVENTION

According to a typical embodiment of the present invention, a light-weight head-mounted display can be provided with which the problem of the strength of the members can be solved and a feeling of a comfortable fit can be obtained.

According to one aspect of the present invention, there is provided a head-mounted device mounted on a wearer's head comprising:

a first pressing unit to press against the wearer's head to a center of his/her head from a position of his/her medulla;

a second pressing unit to press against the wearer's head in an opposite direction to a pressing direction of the first pressing unit; and a mounting unit to mount the head-mounted device on the wearer's head by adjusting at least one of the first pressing unit and the second pressing unit.

Further features of the present invention will become apparent from the following description of exemplary embodiments with reference to the attached drawings.

BRIEF DESCRIPTION OF THE DRAWINGS

FIG. 5 is a plan view of the HMD 301 in FIG. 3;

DESCRIPTION OF THE EMBODIMENTS

Preferred embodiments of the present invention will now be described in detail in accordance with the accompanying drawings.

Figure 1:
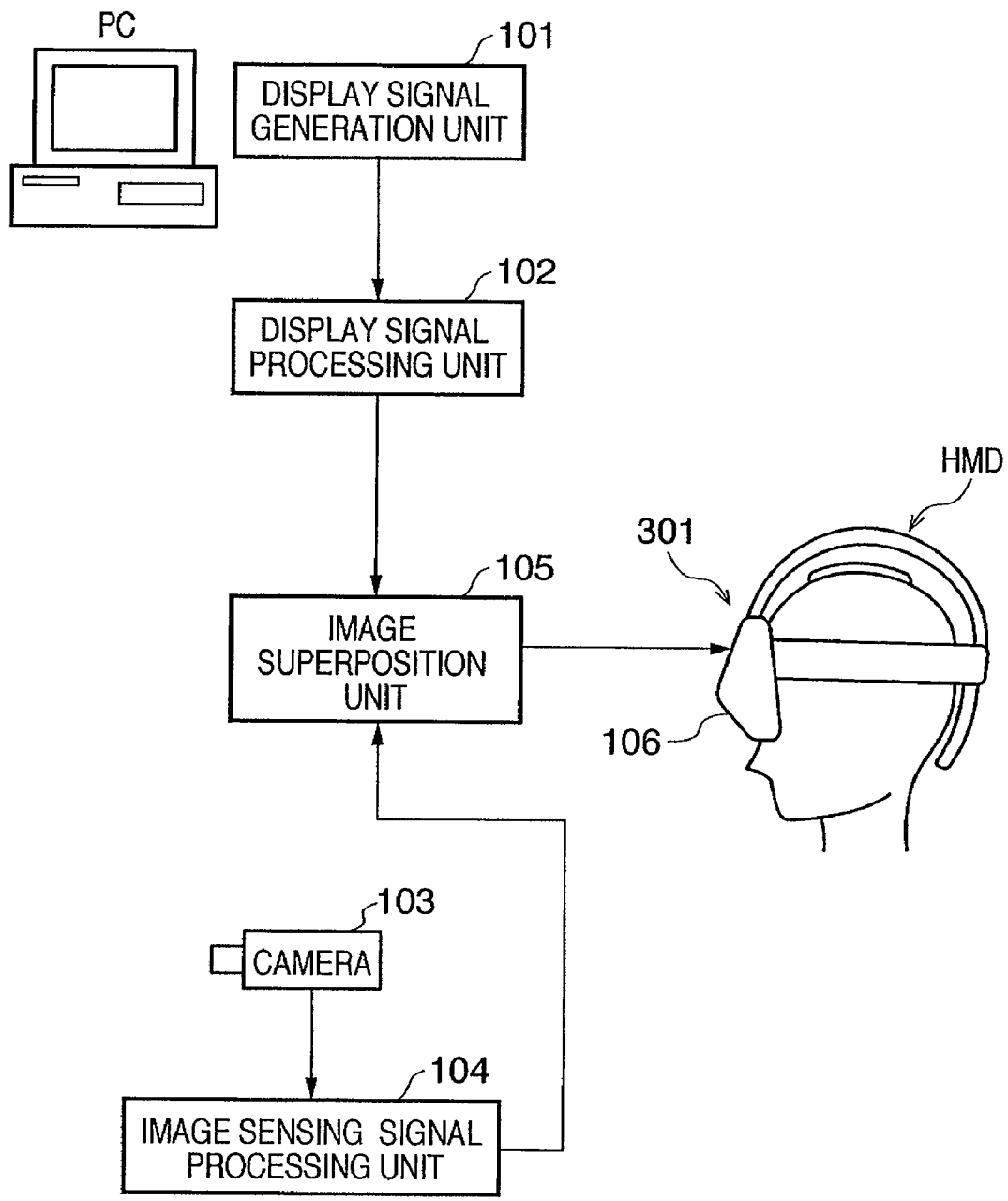
FIG. 1 is a block diagram showing an example of the configuration of a video display system according to an embodiment of the present invention.

FIG. 1 is a block diagram showing an example of the configuration of a video display system according to an embodiment of the present invention. A display signal generation unit 101 generates a video signal of a CG or the like to be displayed on a video display unit 106 in a head-mounted display (HMD) 301. The display signal generation unit 101 generally is a computer such as a PC. The display signal generated by the display signal generation unit 101 is sent to a display signal processing unit 102. The display signal processing unit 102 converts the display signal generated by the display signal generation unit 101 to a signal format transmittable to the HMD 301.

An image sensing camera 103 having an image sensing device such as a CCD and an image sensing lens performs image sensing to obtain an external video image. Note that the direction of image sensing by the image sensing camera 103 approximately corresponds to a viewer's visual axis such that a video image viewed from the same line of sight as that of the viewer can be obtained. The video image obtained by the image sensing camera 103 is sent to an image sensing signal processing unit 104, and subjected to signal processing to a format appropriate for display on the video display unit in the HMD 301.

The image generated by the display signal generation unit 101 and the image obtained by the image sensing camera 103 are superposed by an image superposition unit 105, and displayed on the video display unit in the main body of the HMD 301.

Figure 2:
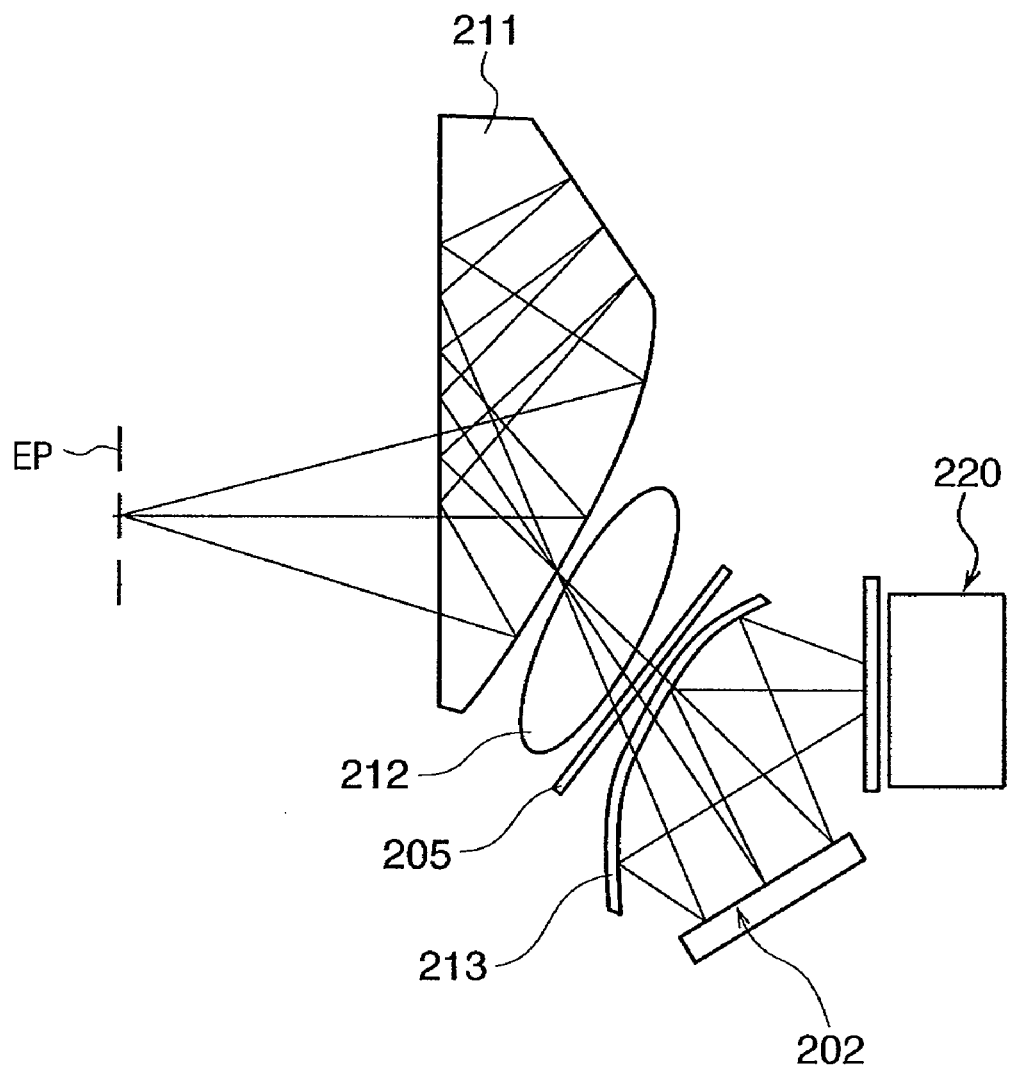
FIG. 2 is an example of the structure of a video display unit in a head-mounted display (HMD)

FIG. 2 is an example of the structure of the video display unit in the HMD 301 as a head-mounted display according to the present embodiment. In FIG. 2, a liquid crystal display device 202 is a reflective liquid crystal display device which displays a two-dimensional video image by reflecting an incident linear polarized light ray while changing the polarization direction. A light source unit 220 functions as a light source to illuminate the liquid crystal display device 202. A light ray emitted from the light source unit 220 is reflected with a half mirror 213 and enters the liquid crystal display device 202. The reflective liquid crystal display device 202 changes the polarization direction of the incident light in correspondence with the displayed video information and reflects the incident light. The light ray reflected by the liquid crystal display device 202 is transmitted through the half mirror 213 and through a polarizing plate 205, thereby becomes an observable video image. The light ray transmitted through the polarizing plate 205 is enlarged with a lens 212 and an ocular prism 211, and is emitted onto the viewer's eyeballs EP. The half mirror 213, the polarizing plate 205, the lens 212 and the ocular prism 211 form an ocular optical system.

Figure 3:
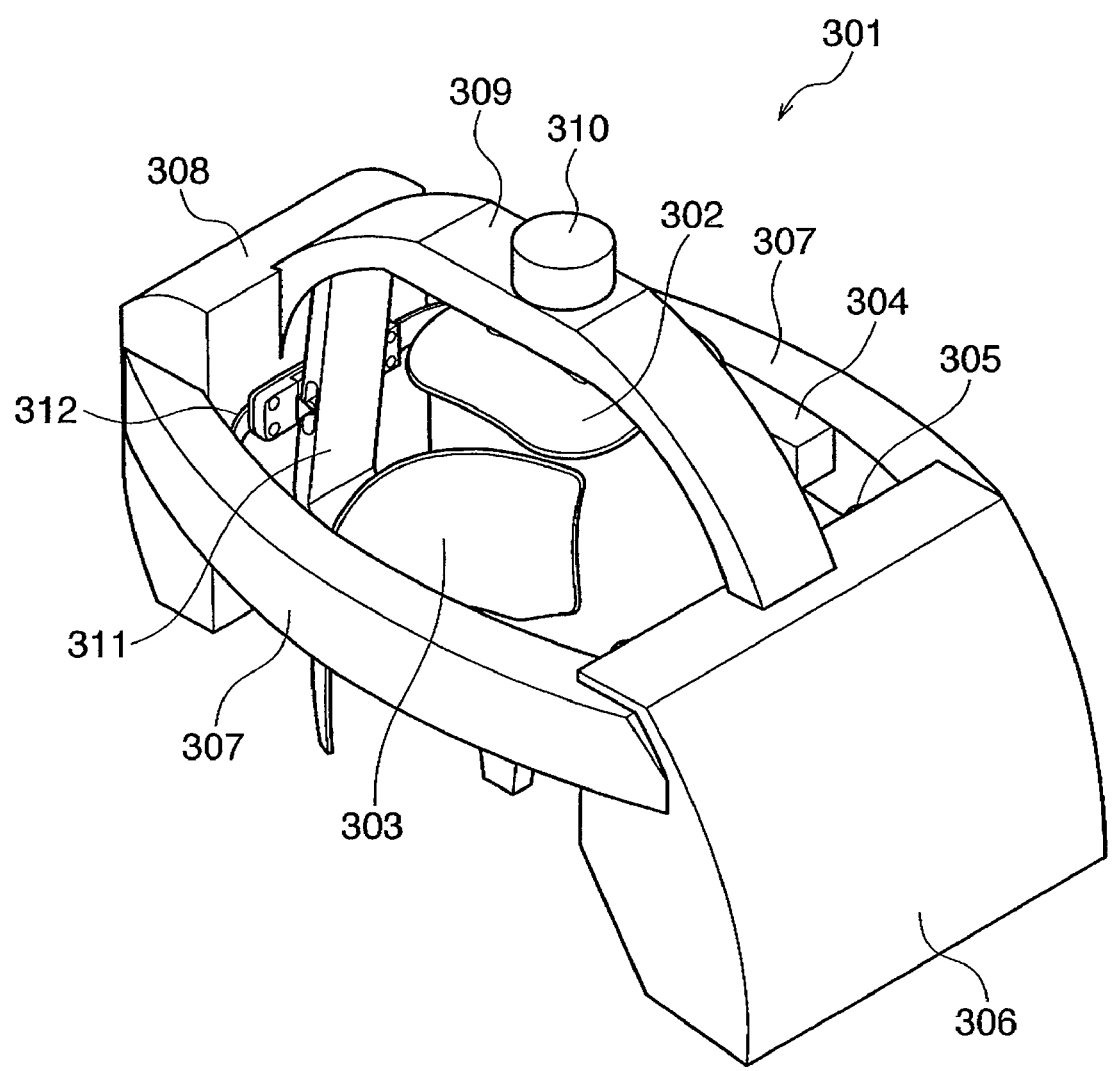
FIG. 3 is a perspective view showing the outer appearance of an HMD 301 according to the embodiment.
Figure 4:
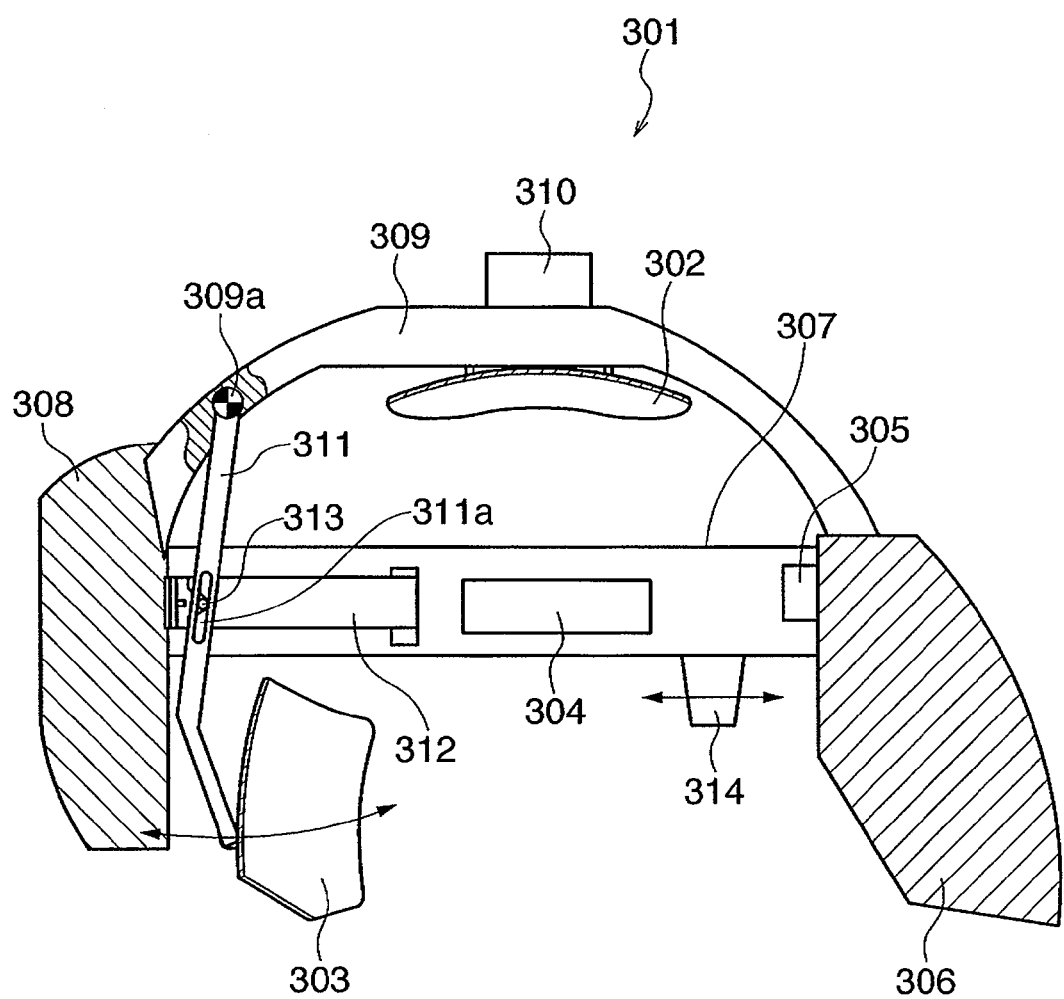
FIG. 4 is a cross-sectional view of the HMD 301 in FIG. 3.
Figure 6:
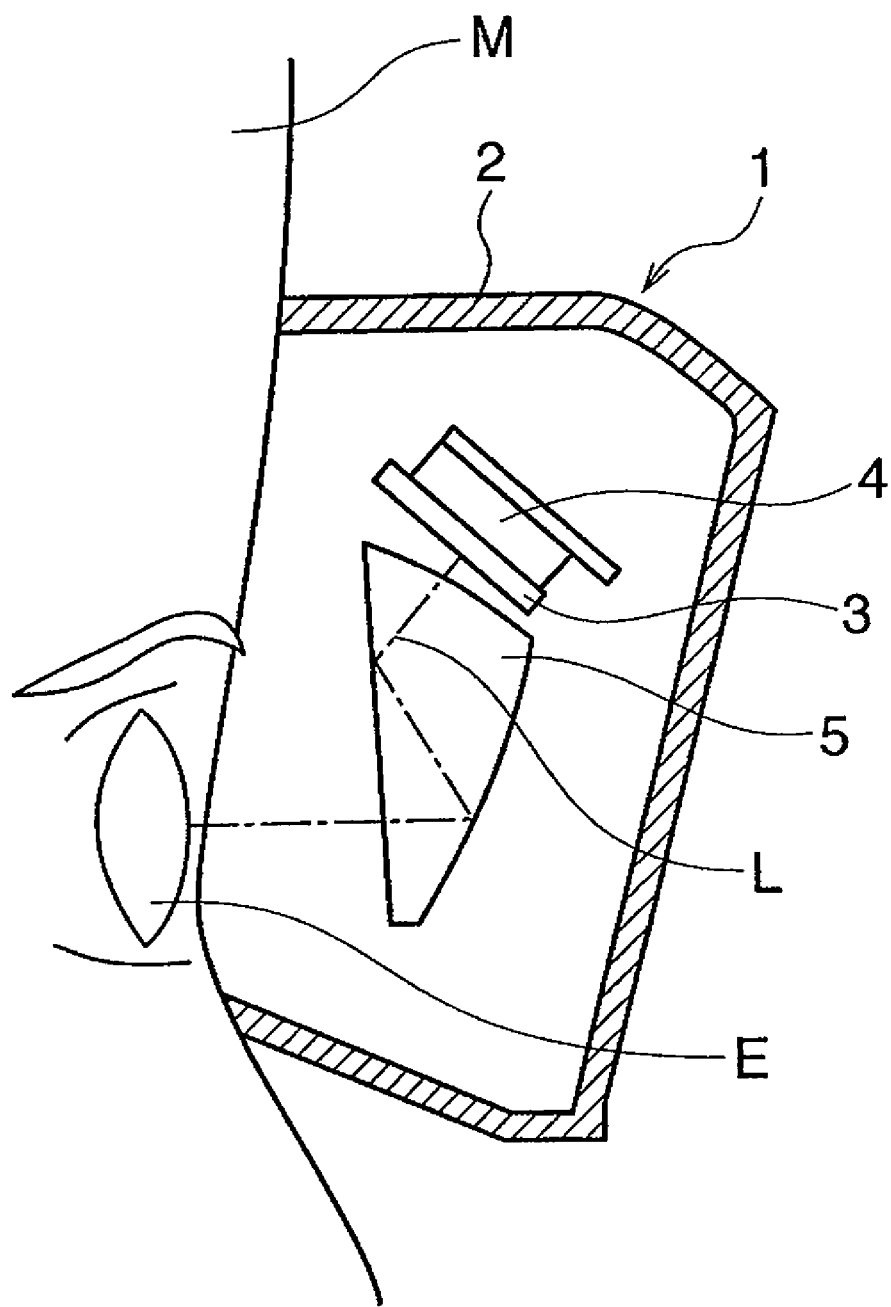
FIG. 6 illustrates the structure of the video display unit in the general head-mounted display.
Figure 7:
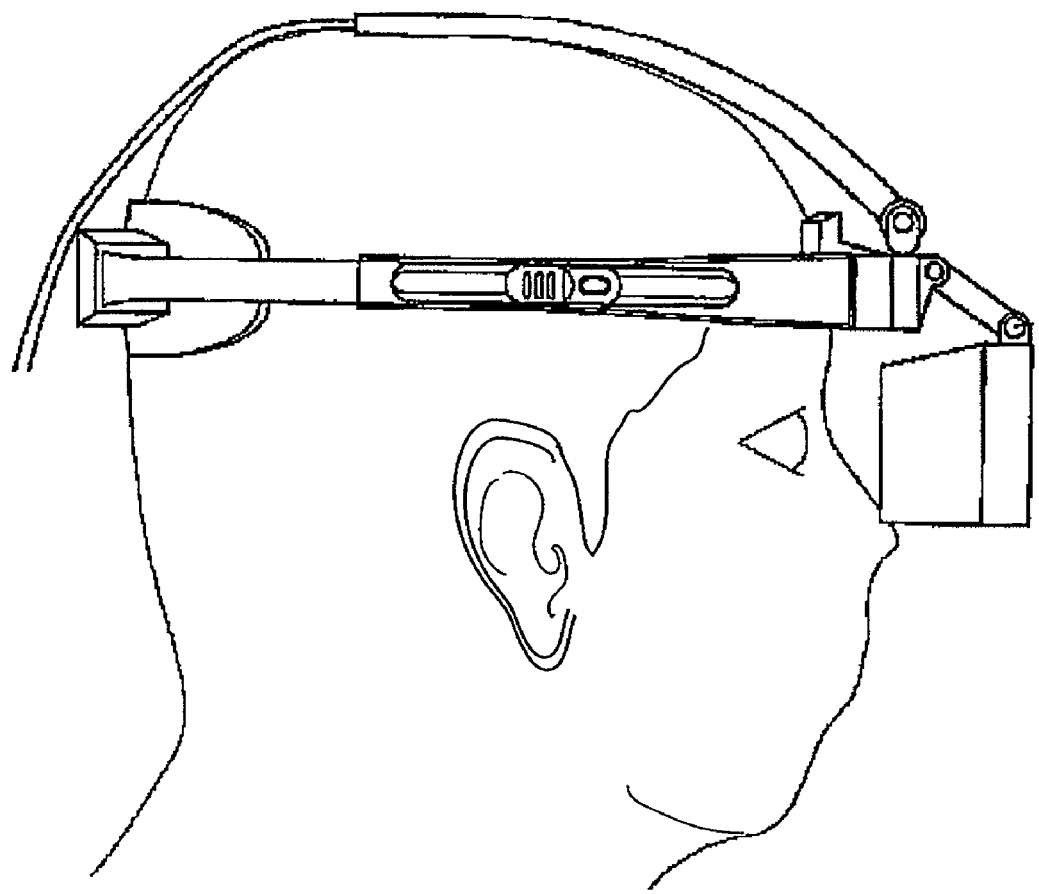
FIG. 7 illustrates the structure for mounting the general head-mounted display on a viewer's head.

FIG. 3 is a perspective view showing the outer appearance of the HMD 301 according to the present embodiment. Further, FIG. 4 is a cross-sectional view of the HMD 301 cut along a central line. Next, a structure to press against the viewer's head with an occipital pad will be described in detail using these figures.

When the viewer wears the HMD 301 on his/hear head, a parietal pad 302 as a parietal region pressing member, an occipital pad 303 as an occipital region pressing member, side pads 304 as temporal region pressing members, and a front pad 305 as a frontal region pressing member are brought into contact with the viewer's head.

The optical system unit described in FIG. 2 is provided in two positions corresponding to left and right eyes inside an HMD main body display unit 306. That is, the HDM main body display unit 306 is a case member including the liquid crystal display device 202 as a video display device and the ocular optical system as shown in FIG. 2. Further, the HMD main body display unit 306 is provided with the front pad 305 to press against the frontal region of the head of the viewer head wearing the HMD 301.

A side frame 307 is provided on both left and right sides of the HMD main body display unit 306. The side frames 307 are connected to an occipital unit 308. That is, the side frame 307 functions as a temporal region supporting member extending from the above described case member forming the HMD main body display unit 306 in the direction of the temporal region of the viewer wearing the HMD 301. The side frame 307 is provided with the side pad 304.

Further, a relay board to relay signals between the HMD main body display unit 306 and a controller unit (not shown) is provided inside the occipital unit 308. Note that the relay board is not limited to a position inside the occipital unit 308. The relay board may be placed on the side of the HMD main body display unit 306 for intensive control of all the functions, however, in such an arrangement, the HMD main body display unit 306 is very heavy. When the HMD main body display unit 306 is heavy, the viewer wearing the HMD 301 feels as if he/she is toppling forward and a comfortable fit cannot be obtained. Accordingly, in the present embodiment, in consideration of the balance of weight of the entire HMD 301, the weight is dispersed in its longitudinal direction, thereby the barycentric position of the HMD 301 is set closer to the central position of the viewer's head. That is, the relay board is provided inside the occipital unit 308, and thereby weight distribution is optimized.

In the present embodiment, the HMD main body display unit 306 and the occipital unit 308 are interconnected using a parietal frame 309 other than the above-described side frames 307. A parietal pad 302 to support the parietal region of the viewer's head is attached to the parietal frame 309. A screw groove is formed in a support shaft supporting the parietal pad 302, such that the parietal pad 302 is moved in a vertical direction by turning a dial 310. In this arrangement, the HMD 301 can be adjusted to an eye-friendly position for the viewer by moving the parietal pad 302 upward/downward in correspondence with the size of the viewer's head.

That is, the HMD 301 according to the present embodiment has a parietal frame 309 as a parietal region supporting member extending from the above case forming the HMD main body display unit 306 in the direction of the parietal region of the viewer wearing the HMD 301. The parietal frame 309 is provided with the parietal pad 302 to press against the parietal region of the viewer's head when wearing the HMD 301.

The parietal frame 309 is rotatably connected to an occipital arm 311. A rotary section 309a as a rotational center is provided in the rear of the parietal frame 309. The end of the occipital arm 311 on the opposite side to the connection position with the parietal frame 309 is connected with the occipital pad 303. The occipital pad 303 presses against the occipital region of the viewer's head wearing the HMD 301. Further, the side frames 307 are provided with a length-adjustable headband 312 to fasten the viewer's head in correspondence with the size of the viewer's head when wearing of the HMD 301. The occipital arm 311 is also connected to the headband 312. That is, the occipital arm 311 is an occipital region supporting member which has a rotary section rotatably connected with the parietal frame 309 as a parietal region supporting member and a joint section connected with the headband 312 as a band member. Note that the occipital region supporting member is provided so as to extend downward from the occipital regional side of the viewer wearing the HMD 301, and has the occipital pad 303 to press against the occipital region of the viewer's head. The occipital arm 311 is rotated about the rotary section 309a in correspondence with the length of the headband 312, and by the rotation, the occipital pad 303 presses against the occipital region of the viewer's head.

Hereinbelow, the structure to press against the viewer's head with the occipital pad 303 will be described in more detail with reference to FIG. 4.

In the HMD 301 according to the present embodiment, the rotational center of the occipital arm 311, that is, the position of the rotary section 309a, is desirably on the rear side from the end point of the occipital region of the viewer's head.

As described above, the headband 312 to fasten the viewer's head for attachment of the HMD 301 is provided inside the side frames 307. The headband 312 is provided with a tongue 314 by which the viewer may adjust the band. The viewer can push the headband 312 in the longitudinal direction by pulling the tongue 314. With this structure, the length of the headband 312 can be adjusted in correspondence with the size of the viewer's head.

Further, as described above, the headband 312 is connected to the occipital arm 311. An oblong hole 311a is formed in a joint section of the occipital arm 311 with the headband 312. A shaft 313 provided in the rear of the headband 312 is engaged with the oblong hole 311a. With this structure, the occipital arm 311 engaged with the headband 312 is rotated about the rotary section 309a by moving the headband 312. With this rotation, the occipital pad 303 attached to the occipital arm 311 is pressed against the occipital region of the viewer's head.

Note that as a mechanism to fasten the headband 312 to firmly fix the occipital pad 303 to the viewer's head and prevent slack in the headband 312, a structure having a rack and pinion for pull-up and a latch for prevention of reverse rotation may be employed. The above mechanism is not limited to this structure, but any other known structure may be employed as long as it is provided with a slack prevention mechanism.

Further, the oblong hole 311a provided in the occipital arm 311, engaged with the shaft 313 provided on the headband 312, has an oblong shape. Accordingly, the oblong hole 311a has a function to guide the movement of the occipital arm 311 with respect to the headband 312. That is, the engagement between the oblong hole 311a and the shaft 313 enables relative positional change of the both members in one direction. As a result, the occurrence of a problem that a uniform pressing force with the occipital pad 303 cannot be obtained due to a twist of the occipital arm 311 or a problem that the movement of the occipital arm 311 is twisted and the occipital arm 311 cannot be moved, can be prevented. More particularly, only the rotational movement about the rotary section 309a can be performed without twist of the occipital arm 311 by the engagement between the oblong hole 311a and the shaft 313. The tongue 314 to move the headband 312 is provided on both left and right sides. No problem occurs when the tongues 314 are pulled equally, however, when only one tongue 314 is pulled, the occipital arm 311 receives a twisting force. Accordingly, there is a possibility that the left and right positions of the occipital pad 303 are shifted and the occipital pad 303 cannot be horizontally equally pressed against the viewer's head. Further, there is a possibility that the twist of the occipital arm 311 twists the shaft of the rotary section 309a and the occipital pad 303 cannot be driven. To solve these problems, the engagement between the oblong hole 311a and the shaft 313 regulates the twist of the occipital arm 311 and provides excellent driving. Note that the oblong hole 311a is used in the joint section, but an elongated groove-shaped hole may also be used.

Further, as the reaction force of the force applied to the occipital pad 303 is received with the shaft 313 with which the headband 312 and the occipital arm 311 are engaged, an excessive force is not applied to the rotation central axis of the occipital arm 311. Accordingly, it is not necessary to form the rotary section 309a as a firm member, and weight reduction of the entire device can be realized. In this manner, according to the present embodiment, twist and distortion in the portion pressing the viewer's head are prevented without greatly increasing the strength of materials, and a comfortable fit can be obtained for the viewer.

Next, the use of the occipital pad 303 to press against the viewer's head will be described in detail. In the HMD 301 according to the present embodiment, the rotary section 309a as a rotation central position of the occipital arm 311 provided on the parietal frame 309 is positioned on the rear side from the end point of the occipital region of the viewer's head. When the rotational center of the occipital arm 311 is provided in such a position, the locus of the occipital pad 303 upon rotation of the occipital arm 311 is a downward convex curve (U-shape curve). When the occipital pad 303 with this locus presses against the occipital region of the viewer's head, the occipital pad 303 is brought into contact with the occipital region of the viewer's head from the lower side (i.e., from a position below the occipital region) so as to push up against the occipital region.

With the above structure, the pressing force generated with the occipital pad 303 acts as a force to push up the viewer's head. The reaction force of this pressing force pushes down the HMD 301 against the viewer's head. Accordingly, a wobble of the HMD 301 upon mounting can be prevented with this force pushing down the HDM 301, thereby the HMD 301 can be firmly fixed on the viewer's head. Thus the viewer can obtain a comfortable fit.

FIG. 5 shows the HMD 301 viewed from the parietal region of the viewer's head in a vertically downward direction. As shown in FIG. 5, the occipital pad 303 has an arcuate sectional shape about an axis in the upper vertical direction (i.e., about an axis in the direction in which the parietal pad 302 is pressed when mounted). When the occipital pad 303 having this shape presses against the occipital region of the viewer's head, both ends of the arcuate section are first brought into contact with the viewer's head, then these portions are distorted and a spring force is generated. The spring force functions to press against both ends of the occipital pad 303 in a direction toward the center of the viewer's head. As the viewer's head is pressed in the direction toward the center of the head in two positions (i.e., the both ends of the arcuate section of the occipital pad 303), the occipital pad 303 can be stabilized without wobbling.

Further, the portion against which the occipital pad 303 is pressed includes an energy center "hollow of the neck". As a peripheral portion of the hollow of the neck (medulla) is pressed with the occipital pad 303, the viewer does not feel as much discomfort due to pressure applied with the occipital pad 303. More particularly, when the occipital pad 303 has a curvature radius of about R 75 or less viewed from the parietal region, the both ends of the occipital pad 303 are first brought into contact with the viewer's head, and the peripheral portion of the hollow of the neck can be pressed against with the occipital pad 303, and thereby an extremely comfortable fit can be obtained.

As described above, in the HMD 301 according to the present embodiment, the occipital pad 303 to press against the occipital region of the viewer's head is connected with the occipital arm 311, and the rotational center of the occipital arm 311 is set on the parietal frame on the rear side from the end point of the occipital region of the viewer's head. In this arrangement, when the viewer wears the HMD 301 on his/her head, as the occipital pad 303 is brought into contact with the viewer's head such that the occipital region of the viewer's head is pushed up with the occipital pad 303, the viewer can obtain a comfortable fit.

Further, the occipital pad 303 has an arcuate sectional shape about the vertical axis passing downward from the parietal region of the viewer's head. Upon pressing the occipital region of the viewer's head, the occipital pad 303 having this shape presses against the peripheral portion of the hollow of the neck of the viewer in the direction toward the center of the viewer's head. Accordingly, the occipital pad 303 can be stably pressed against the viewer's head without wobbling and can provide a comfortable fit to the viewer.

As described above, according to the above-described embodiment, the strength required for the respective members can be reduced, and a comfortable fit can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-089044, filed Mar. 29, 2007, which is hereby incorporated by reference herein in its entirety.

What is claimed is:

1. A head-mounted device mounted on a wearer's head comprising:
   a first pressing unit to press against said wearer's head to a center of said wearer's head from a position of said wearer's lower portion of occipital;
   a second pressing unit to press against said wearer's head in an opposite direction to a pressing direction of said first pressing unit;
   a mounting unit to mount said head-mounted device on said wearer's head by adjusting at least one of said first pressing unit and said second pressing unit; and
   a first supporting unit, extending in a direction of a temporal region of said wearer's head, having a band member with a length adjustable by said mounting unit,
   wherein said first pressing unit rotates with rotation center located between a parietal region of said wearer and occipital region of said wearer to move along a downward convex curve and presses said wearer's occipital from the lower side in correspondence with adjustment of the length of the band member.

2. The device according to claim 1, further comprising:
   a second supporting unit, extending from said second pressing unit in a direction of a parietal region of said wearer's head, having a parietal region pressing member to press against the parietal region of said wearer's head,
   wherein said pressing unit has an occipital region supporting member extending downward on the side of occipital region of said wearer's head,
   and wherein said occipital region supporting member has a rotary section to rotatably connected to said second supporting unit, a joining section connected to said band member and an occipital region pressing member,
   further wherein said occipital region supporting member rotates about said rotary section in correspondence with adjustment of the length of the band member, thereby said occipital region pressing member presses against the lower position of the occipital of said wearer's head.

3. The device according to claim 2, wherein said rotary section is provided on the rear side from the end of the occipital region of said wearer's head.

4. The device according to claim 2, wherein said band member has a shaft to be engaged with said occipital region supporting member,
   and wherein said joining section has a groove portion or a hole portion to be engaged with said shaft so as to realize relative positional change in one direction between said joining section and said shaft.

5. The device according to claim 2, wherein said occipital region pressing member has an arcuate sectional shape about an axis in a pressing direction by said parietal region pressing member, and both ends of said arcuate sectional shape press against the lower position of the occipital of said wearer in the direction toward the center of said wearer's head.

6. The device according to claim 2, wherein in said occipital region supporting member, said joining section is provided between a position in which said occipital region pressing member is provided and said rotary section.

7. The device according to claim 1, wherein said second pressing unit includes a case member including a video display device and an ocular optical system and having a frontal region pressing member provided so as to press against a frontal region of said wearer's head.

* * * * *